United States Patent
Christian et al.

(10) Patent No.: US 11,087,319 B2
(45) Date of Patent: Aug. 10, 2021

(54) METHODS AND SYSTEMS FOR VALIDATING TRANSACTIONS

(71) Applicant: SecureClose LLC, Mesa, AZ (US)

(72) Inventors: Amos C. Christian, Mesa, AZ (US); Brent Chavez, Chandler, AZ (US); Wendell J. Perkins, Gilbert, AZ (US); Joseph J. Dzurinko, Scottsdale, AZ (US)

(73) Assignee: SecureClose LLC, Mesa, AZ (US)

( * ) Notice: Subject to any disclaimer, the term of this patent is extended or adjusted under 35 U.S.C. 154(b) by 212 days.

(21) Appl. No.: 15/985,074

(22) Filed: May 21, 2018

(65) Prior Publication Data

US 2018/0276665 A1   Sep. 27, 2018

Related U.S. Application Data

(63) Continuation of application No. 14/281,559, filed on May 19, 2014, now abandoned.

(60) Provisional application No. 61/825,654, filed on May 21, 2013.

(51) Int. Cl.
| | |
|---|---|
| *G06Q 40/00* | (2012.01) |
| *G06Q 20/40* | (2012.01) |
| *G06Q 20/32* | (2012.01) |
| *G06Q 20/38* | (2012.01) |

(52) U.S. Cl.
CPC ......... *G06Q 20/40* (2013.01); *G06Q 20/3276* (2013.01); *G06Q 20/389* (2013.01)

(58) Field of Classification Search
CPC ......... G06Q 40/04; G06Q 40/08; G06Q 40/00
See application file for complete search history.

(56) References Cited

U.S. PATENT DOCUMENTS

| | | | |
|---|---|---|---|
| 8,259,153 B1* | 9/2012 | Campbell, III | G06Q 30/02 348/14.01 |
| 2004/0193610 A1 | 9/2004 | Alex et al. | |
| 2009/0327144 A1 | 12/2009 | Hatter et al. | |
| 2010/0011428 A1 | 1/2010 | Atwood et al. | |
| 2011/0249081 A1* | 10/2011 | Kay | H04M 3/5183 348/14.03 |

(Continued)

OTHER PUBLICATIONS

Seizing a competitive edge Anonymous. Bank Systems & Technology; Monmouth Junction vol. 34, Iss. 6, (Jun. 1997): 52-53. (Year: 1997).*

*Primary Examiner* — Lalita M Hamilton
(74) *Attorney, Agent, or Firm* — Rankin, Hill & Clark LLP

(57) ABSTRACT

Methods and systems for validating transactions in an automated, secure, regulatory-compliant manner, in which a second party is presented with a graphic user interface that displays a multimedia presentation prepared by or on behalf of a first party, which provide the second party with an explanation of each document to be executed. The system includes a device for capturing the buyer's digital signature, and a recording device for capturing the actions and responses of the second party before the second party authorizes that the digital signature be associated with each document. In addition, the methods and systems according to the invention create and maintain digital files, which are available as a backup and for support in the unlikely event that there is a dispute regarding the transaction.

19 Claims, 14 Drawing Sheets

(56) References Cited

U.S. PATENT DOCUMENTS

| | | | | |
|---|---|---|---|---|
| 2013/0050512 A1* | 2/2013 | Gonser | .............. | H04N 1/32112 |
| | | | | 348/207.1 |
| 2013/0103482 A1* | 4/2013 | Song | ...................... | G06Q 30/02 |
| | | | | 705/14.26 |
| 2013/0179779 A1* | 7/2013 | Sandler | ................... | G06F 3/011 |
| | | | | 715/706 |
| 2015/0302536 A1* | 10/2015 | Wahl | ................... | G06F 19/3418 |
| | | | | 705/2 |

* cited by examiner

METHODS AND SYSTEMS FOR VALIDATING TRANSACTIONS

CROSS-REFERENCE TO RELATED APPLICATIONS

This application is a continuation of U.S. application Ser. No. 14/281,559, filed May 19, 2014, and claims priority to U.S. Provisional App. Ser. No. 61/825,654, filed May 21, 2013.

BACKGROUND OF INVENTION

Field of Invention

The present invention relates to methods and systems for validating transactions. More particularly, the present invention provides methods and systems for validating transactions in an automated, secure, regulatory-compliant manner, which utilizes a display terminal, multimedia presentation, audio and video recording device, data storage and an electronic signature capture device.

Description of Related Art

Transactions, which are sometimes referred to herein as "events", are memorialized in a variety of settings including, for example, the purchase and sale of motor vehicles, insurance, real estate, consumer sales agreements, commercial agreements, governmental transactions, statements of understanding and in other situations where the parties to an agreement desire to memorialize the terms thereof. During such events, it is important that both parties to the agreement fully understand and agree to all terms and conditions set forth in the agreement;
 the agreement comply with all applicable laws and regulations; and
 all of the documents required to formally effectuate the sales transaction be properly executed by both parties.

In many cases, one of the parties to the agreement may be represented by an agent. For various reasons, the agent may not fully and accurately explain or adequately represent the full terms and conditions of the transaction and the documents presented to the other party. This can occur for a variety of reasons such as, for example, the agent is fatigued, the agent was not properly trained, the agent does not fully understand the terms and conditions set forth in the documents or due to a conflict of interest or a lack of interest in seeing that the closing is completed in a proper manner. Also, for various reasons an agent may desire to rush the other party through the closing process and thus not fully explain the terms and conditions of the transaction or engage in other conduct that limits the other party's opportunity to completely understand certain terms and conditions. If the other party is apprehensive about a certain stipulation that is binding within the contract, the agent might allude that the stipulation is optional, or that the stipulation is less severe than it truly is. The failure to ensure that the closing of the transactions is accomplished in a fair and proper manner can lead to costly and devastating errors and omissions, which drives up insurance and litigation costs and might put the party represented by the agent at risk for financial loss or a loss of reputation.

In the past, the present inventors had experience using transaction closing processes in the automobile sales industry in which a buyer was isolated in a closed environment and asked to view a non-interactive video presentation of the closing documents, which was accompanied by an explanation of the documents to be executed. These prior art processes were not automated or interactive, did not allow for or account for differences in customer comprehension, and did not provide an adequate level of validation of the fairness of the closing.

BRIEF SUMMARY OF THE INVENTION

In view of the foregoing, the present application discloses systems for validating a transaction between a first party and a second party. In one embodiment, the system comprises a multimedia presentation prepared by or for the first party, which includes at least one document to be signed by the second party accompanied by explanation of one or more terms set forth in said at least one document. The multimedia presentation is displayed to the second party using a display terminal, preferably in a kiosk that substantially isolates the second party from outside distractions. The system includes a device for capturing the second party's signature in digital format. The system includes a recording device configured to acquire audio and video of the second party during the transaction. The audio and video recording is stored in a data storage operatively associated with the recording device. An interface operatively associated with the display terminal allows the second party to control an attribute of the multimedia presentation (e.g., presentation language, pace, appearance of an avatar that is part of the multimedia presentation etc.) and to determine whether the digitally captured signature of the second party may be associated with the at least one document in the transaction.

The present application also discloses methods for validating a transaction between a first party and a second party. In one embodiment, the method comprises the steps of:
 compiling a multimedia presentation that includes at least one document to be signed by the second party accompanied by explanation of one or more terms set forth in said at least one document;
 displaying the multimedia presentation to the second party on a display terminal during the transaction;
 capturing a signature of the second party;
 providing an interface operatively associated with the display terminal that allows the second party to control an attribute of the multimedia presentation and to determine whether the signature of the second party may be associated with the at least one document;
 recording audio and video of the second party during the transaction; and
 storing the audio and video recording of the second party acquired during the transaction.

The present application also discloses a computer readable medium that comprises instructions that, when executed by a processor, perform actions to validate a transaction between a first party and a second party. In one embodiment, the computer readable medium comprises instructions that, when executed by a processor, performs actions including:
 sending transaction information relating to a transaction between a first party and a second party to a compiler module upon receipt of a command from the first party or an agent of the first party;
 displaying a multimedia presentation compiled by the compiler module to the second party on a display terminal during the transaction, said multimedia presentation including at least one document to be signed by the second party accompanied by explanation of one or more terms set forth in said at least one document;

controlling an interface operatively associated with the display terminal that allows the second party to control an attribute of the multimedia presentation and to determine whether signature of the second party captured by a signature capture device may be associated with the at least one document;

controlling a device that records audio and video of the second party during the transaction;

associating the second party's signature with the at least one document upon receipt of a command from the second party authorizing such action; and storing the audio and video recording of the second party acquired during the transaction.

The systems, methods and computer readable medium can be utilized in a variety of applications including, but not limited to, the sale of motor vehicles, insurance, real estate and other consumer transactions. In addition, the systems, methods and computer readable medium can be utilized in commercial agreements, medical authorizations, transactions between citizens and governmental agencies and in other transactions whereby an agreement is to be reached and memorialized between two or more parties.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides systems for validating a transaction between a first party and a second party. The term "first party", unless otherwise indicated, refers to one party to a transaction who will often be, but is not required to be, a provider of a service or a seller of property to the second party to the transaction. The term "first party" is not intended to be restricted to a single individual or company, and may in certain transactions include two or more individuals and/or business entities to the transaction.

The term "second party", unless otherwise indicated, refers to the other party with whom the first party is entering into the transaction. Often, the second party will be, but is not required to be, a consumer who is contracting for a service and/or buying property from the first party. Again, the term "second party" is not intended to be restricted to a single individual or company, and may in certain transactions include two or more individuals and/or business entities.

It will be appreciated that the first party and/or the second party may be represented by an agent in the transaction. The methods, systems and computer readable mediums according to the invention are particularly useful when the first party is represented by an agent, as the methods, systems and computer readable medium remove any potential adverse influences that such an agent can bring to the transaction. The term "agent" is not intended to be limited to only individuals having a legal agency relationship with the first party, but is intended to encompass all individuals who, on behalf of one of the parties (typically the first party), interact with the other party (typically the second party) prior to and during execution of the document(s) that memorialize the transaction. An agent in this sense could be, but need not be, a sales representative, manager or other employee of a party to the transaction, a third party transaction closing entity or any other person or business entity that acts on behalf of a party to the transaction.

Figure 1:
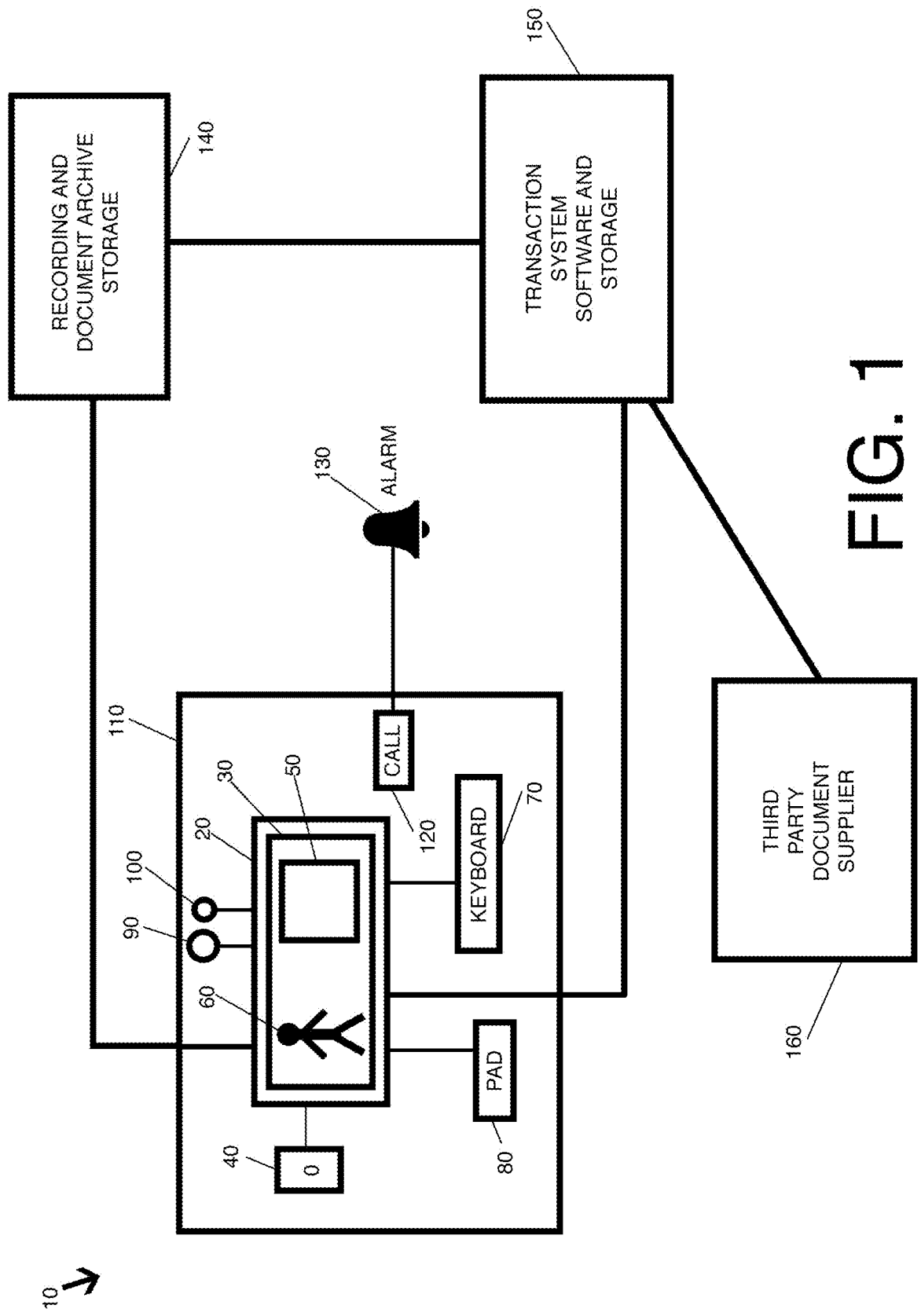
FIG. 1 is a schematic representation of various components that can be utilized in an embodiment of a system according to the invention.

FIG. 1 shows a schematic representation of exemplary components of system 10 according to an embodiment of the invention. In the embodiment illustrated in FIG. 1, the system includes a multimedia display terminal 20 that is configured to present a multimedia presentation that includes a portion that is visible to the second party on a display screen 30 and an audible portion that is presented to the second party, typically via speakers 40 or, in some embodiments, via headphones worn by the second party. The display terminal can be a computer monitor, television or any other device that includes a display including, for example, a wireless device such as a tablet computer (e.g., an iPad® or the like).

The multimedia presentation is prepared by or for the first party for presentation to the second party on the display terminal. The complete multimedia presentation can be prepared in advance of the transaction, or more commonly, the multimedia presentation can be compiled and assembled by the system and software at the time of the transaction from documents and associated multimedia components that were prepared in advance of the transaction. In some embodiments, which are discussed in greater detail below, the multimedia presentation or components thereof are prepared as a service by a third party on behalf of the first party.

The multimedia presentation includes at least one document 50, and likely a plurality of documents, that need to be signed by at least the second party (or the agent of the second party, which in this context the term "second party" is intended to subsume). The term "signed" means that the document must ultimately bear the signature of the second party and/or the initials of the second party, as need be. In many instances, the document will also need to be signed by the first party (or the agent for first party, which in this context the term "first party" is intended to subsume). In some instances, the document may also require the signature of a notary or one or more witnesses.

Preferably, the multimedia presentation begins by greeting the second party and providing an introduction, which welcomes and acclimates the second party to the various components of the system and the manner in which they operate and can be controlled by the second party. As part of the multimedia presentation, the document(s) to be signed by the second party are displayed to the second party on the display terminal and are preferably simultaneously explained to the second party. The explanation is preferably provided by an avatar 60. The term "avatar" is intended to reference an animated guide, which may take on any of a number of forms or appearances (e.g., human forms, animal forms, robotic forms etc.). The term "animated" in this sense not only encompasses conventional computer-aided graphic animation, but also encompasses photographic and/or videographic images that have been prepared to guide a second party through a transaction. The appearance of the avatar may, in some embodiments, be selected by the second party to the transaction. As noted above, the avatar explains the content of the document(s) to be signed by the second party to the second party. The explanation is intended to ensure that the second party understands the terms set forth in the document to be signed by the second party, and that the explanation is presented in a coherent, neutral and unbiased manner.

Digital versions of every document to be presented during the transaction are prepared in advance, and formatted for display to the second party during the multimedia presentation. Preferably, a third party document service is utilized, which creates documents that are custom-tailored for the particular transaction, and which are compliant with all laws, regulations and best practices for the specific jurisdiction, industry, or business setting. The documents are stored in a secure database for retrieval at the time of the presentation. As noted, the database includes a selection of documents that have been pre-audited to ensure compliance with local and federal rules and regulations and business policies and practices, and which have been updated as need be in response to changes to the law or other best practices. A compiler module that is configured to select documents identified in the documents database and stored in an associated documents storage device can be used to select documents that are appropriate for the transaction and to compile said selected documents and their associated explanations into the multimedia presentation for display to the second party during the transaction.

An interface is operatively associated with the display terminal. In the embodiment illustrated in FIG. 1, the interface is a keyboard 70. It will be appreciated that one or more interfaces can be utilized including, but not limited to, touch screen interfaces that are integrated into the display terminal, a computer mouse, a track ball, a touch pad and custom interfaces that may include one or more buttons or switches, which may be lighted, for the second party to interact with during the multimedia presentation. Thus, the term "interface" is not intended to be limiting, and may encompass any device that allows the second party to interact with and control one or more attributes of the multimedia presentation. Attributes of the multimedia presentation that can be controlled by the second party include, for example, one or more selected from the group consisting of a language of the multimedia presentation, a pace at which the multimedia presentation is presented to the second party, and an appearance of the avatar.

The system also includes a device 80 for capturing a signature of the second party. The device for capturing a signature of the second party can be an electronic signature pad or other device (e.g. an optical scanner that obtains an image of a written signature provided by second party). The device for capturing the signature of the second party is operatively associated with the display terminal so that the second party can see the captured signature. Using the interface, the second party determines whether the captured signature may be associated with the at least one document, and only does so once the second party has confirmed an understanding and acknowledged agreement to the terms thereof. In a preferred embodiment, once the second party has authorized the document to be signed, an image of the document bearing the second party's signature is displayed on the display terminal to the second party. The image of second party's signature is preferably not retained in storage for reuse (although this is possible). On the contrary, it is preferably deleted immediately after the transaction process is completed (i.e., only the second party's signatures/initials as applied with the permission of the second party during the transaction process to documents utilized in in the transaction are retained in storage).

A camera 90 and a microphone 100 are situated proximal to the display terminal and may be, but are not required to be, integrated with the display terminal. The camera and microphone record the second party during the transaction, including during the multimedia presentation. The camera preferably captures videographic images of at least the face of the second party, and the microphone preferably captures any audible sounds emitted by the second party during the transaction. The video and audio recorded during the transaction is time-stamped and matched with the multimedia presentation presented to the second party, as further explained in detail below.

Once the explanation of each document that is part of the transaction is complete, the second party will be asked to electronically sign the document. The second party's acknowledgement and understanding of the terms is captured by the video camera and/or microphone. Additionally, electronic signature button will be displayed which allows the second party to decide whether to execute the document or not. If accepted, the second party's signature will be affixed as a digitally secure encrypted electronic signature that will not allow any future modifications. The electronically captured signature or other mark is then displayed on the executed document to the second party.

The display terminal, interface, camera and microphone, and optionally the device for capturing the signature of the second party, are all preferably located in a kiosk 110. The term "kiosk" refers to any structure that sufficiently isolates the second party from outside distractions during the multimedia presentation. In some embodiments, the kiosk may take the form of a room that contains the display terminal, interface, camera and microphone, and optionally the device for capturing the signature of the second party. If desired, the room be accessible by a single door, which can be closed to provide the second party with isolation and comfort during consideration of the terms and execution of the document(s) during the multimedia presentation. The door can be equipped with an electronic monitor, which confirms whether the door was opened at any point during the transaction.

In other embodiments, the kiosk may take the form of a stall having sidewalls that block the second party's forward, left and right views outside of the stall when the second party is positioned in front of the display terminal. In such an embodiment, it is preferably for the second party to wear headphones, which ensure that the second party can hear the audible portion of the multimedia presentation but cannot hear other distracting noises. Preferably, the stall is placed near a wall such that a second party can walk between the wall and the stall to assume a position (standing or seated) in front of the display terminal, but the wall makes it difficult for any other person to occupy a position behind the second party while the second party views the multimedia presentation.

The kiosk can be provided by the first party on premises controlled by the first party such as, for example, at a sales center, office or retail location. Alternatively, the kiosk can be located on premises controlled by a third party such as, for example, at a title company, financial institution, or other third party service provided. In yet another embodiment, the kiosk can be at a location selected by the second party. In this embodiment, the multimedia presentation can be presented to the second party via the second party's computer or other suitable device, and video and audio of the second party can be captured during the transaction by devices under the control of the second party and integrated into a recording that also includes the multimedia presentation. Thus, the systems, methods and computer readable medium according to the invention can be utilized in transactions that occur over an Internet connection using communication devices and recording equipment of the second party (i.e., home use).

The interface also preferably allows the second party to make a request for additional information from the first party or the agent of the first party. The additional information may relate to any matter relevant to the transaction including, but not limited to, a further explanation regarding one or more terms of a document to be signed by the second party. In one embodiment, one or more requests for further explanation and/or additional information can be anticipated by the first party, and thus can be included as an optional part of the multimedia presentation, which the second party can select or bypass using the interface depending upon the second party's comfort with and understanding of the terms. This allows the second party to control how detailed the explanation of the contract terms are provided to the second party. Some second parties are sophisticated and understand the terms of transaction documents with little need for detailed explanation of the terms, whereas other parties are less sophisticated and are thus able to further explanation and clarification of terms. The interaction between the second party and the multimedia presentation provides the second party with the ability to control the pace of the multimedia presentation.

The second party may have questions or concerns that are not anticipated by the first party and are thus not available as optional presentations to be selected by the second party. In some embodiments, in order to provide the second party with further options to obtain additional information, the interface may include the ability of the second party to initiate a chat session with the first party, an agent of the first party or a third party retained by the first party to provide such assistance. The individual responding to the chat session request on behalf of the first party could, but need not be, located remotely from the kiosk (e.g., at a call center or other facility maintained at a remote location by the first party or a third party retained by the first party for such purposes). It will be appreciated that communications between the second party and the first party, an agent of the first party, or a third party retained by the first party could occur other means, such as through instant messaging. Preferably, the communications with the second party are integrated into the recording made of the transaction.

In yet another alternative embodiment, the system includes a call button 120 that sets off an audible, visual and/or electronic alarm 130, which permits the second party to summon the first party or an agent of the first party to confer with the second party in the kiosk. It will be appreciated that the call button could be a telephone or any other device that summons the first party or the agent of the first party to come to the kiosk at the second party's request. Any communications between the first party or the agent of the first party and the second party are preferably recorded by the recording device (i.e., the camera and microphone) and integrated into the recording made of the transaction.

An optional feature of a system and method of the invention is the use of an audio interface, which requires the second party to audibly repeat one or more terms or conditions of an agreement, and based upon reception of an audible response from the second party by an audio sensor and associated software, confirms that the second party has expressed an understanding of it before the multimedia presentation will continue. Furthermore, the multimedia presentation can optionally further include tests or challenges, that serve to verify that the second party understood and acknowledged the terms of the document before consenting to allow the second party's signature to be affixed thereto.

As noted above, the audio and video captured during the transaction using the camera and microphone are preferably time stamped and integrated with the multimedia presentation shown to the second party, preferably in a side-by-side format (i.e., the multimedia presentation appears on one side, and the audio and video of the second party contemporaneously captured of the second party during the transaction appears on the other side). This recording is preferably stored in a data storage that is operatively associated with the recording device. The data storage can be integrated with the display terminal (e.g., the display terminal can be a computer containing data storage). More preferably, the data storage is located remote from the kiosk such as in a data center or using storage 140 provided by a cloud computing service provider via an appropriate connection. Recordings can be retained for an indefinite period of time. Or, more practically, recordings can be retained for a predetermined period of time, and then be deleted or otherwise destroyed thereafter.

The multimedia presentation preferably resides and is created using an off-site computer server system 150, which may also be cloud based. This system may be configured to acquire documents and services from systems maintained by third parties 160 (one third party system is illustrated, but it will be appreciated that documents can be obtained from multiple third parties for assembly and use in a particular transaction) across different platforms. The documents and services (e.g., multimedia presentations, software etc.) is integrated by the server system for subsequent using in the transaction process between first and second parties. The server system 150 also either includes or communicates with the storage 140 of the recordings made during transactions at the kiosk so that the same can be accessed. In other embodiments, the documents may also be acquired by the server system 150 from the first party (as opposed to a third party vendor), or be generated by the system itself.

All data, communications, recordings etc. utilized by or generated by the systems and methods of the invention are secure, meaning that efforts are made to ensure that no unauthorized individuals or systems can access the data, communications, recordings etc. Data and communications can be encrypted, and security keys, passwords, etc. can be used. In addition, the system can include monitors for identifying those persons who access the data, and log the actions taken by such individuals so that forensic review can be completed.

The recording of the transaction can be reviewed to ensure that no errors or omissions have occurred during the transaction. Furthermore, the recording provides a detailed and accurate record of events as they transpired if a dispute happens to arise later between the parties as to what occurred during the transaction. Once the transaction is completed, the finished and signed documents are output to a digital file that can be printed or emailed to each party. These digital files are then archived electronically for a predetermined length of time so that they can be reprinted in the future if the need arises. It will be appreciated that the recording made of the transaction can be valuable when and if disputes arise long after the transaction. To discourage litigation and to encourage settlement or reconsideration of the initiation of litigation regarding the transaction, archived copies of the recording can be maintained for a long periods of time (one that exceeds the statute of limitations for actions related to the transaction), and the copies can be made available to second parties and their counsel who may be considering legal action against the first party. The server system 150 can further comprise complaint follow-up compliance functionality, in the unlikely event a complaint is filed by a second party against the first party.

The invention serves to standardize the way sale closings are performed, by giving a verified, compliant set of documents that both protect the parties and thoroughly explain the documents to facilitate understanding and compliance. The invention significantly minimizes (and hopefully virtually eliminates) human error from the sale closing process and presents an impartial, unchanging explanation. The person using the invention is able to make better use of their time and resources, as during the closing process, they are able to begin on their next transaction, reducing wait times and improving customer service. Parties may feel less intimidated and more at ease with the invention, as they can move through their sale closing at their own pace and level of comprehension.

It will be appreciated that the system and method of the invention can be used in other transactions, such as in training and testing environments. One of the concerns with remote training and testing is whether the person who is supposed to be receiving training or being tested is actually the person who attends the remote testing location. While it is difficult to know for certain the degree to which fraud occurs in conventional training and testing environments because of the inability of such systems to verify the identity of individuals and compliance with requirements, there are concerns that individuals (e.g., secretaries or other staff) may take training sessions or tests for others (e.g., managers or other staff), and vice versa. The methods and systems of the invention can make a documented, secure record of the training or testing, which includes confirmation that the person receiving the training or testing did, in fact, receive the training or testing, and also that they were paying attention and understood the information be provided.

Another attribute of the system and methods of the invention is that it can utilized to collect or "mine" data relating to transactions. For example, a first party could collect demographic data relating to second parties, which can be utilized by first parties to improve the delivery of services to second parties or otherwise improve efficiencies of the first party. For example, data could be mined identifying the second party's place of residence or other socio-economic information, which could be utilized to determine the effectiveness of advertising and/or whether certain demographics are being properly served by the first party in a region. Data can also be collected to ascertain whether there are aspects of multimedia presentations that need to be reviewed and altered, or whether there are points in the transaction process that negatively affect closure rates (etc.).

FIGS. 2-12 are flow charts showing the configuration and operational logic of a system according to a preferred embodiment of the invention. It will be appreciated that alternative embodiments are possible, and that the methods and systems as defined in the claims below may deviate from the operational logic set forth in FIGS. 2-12.

Figure 2:
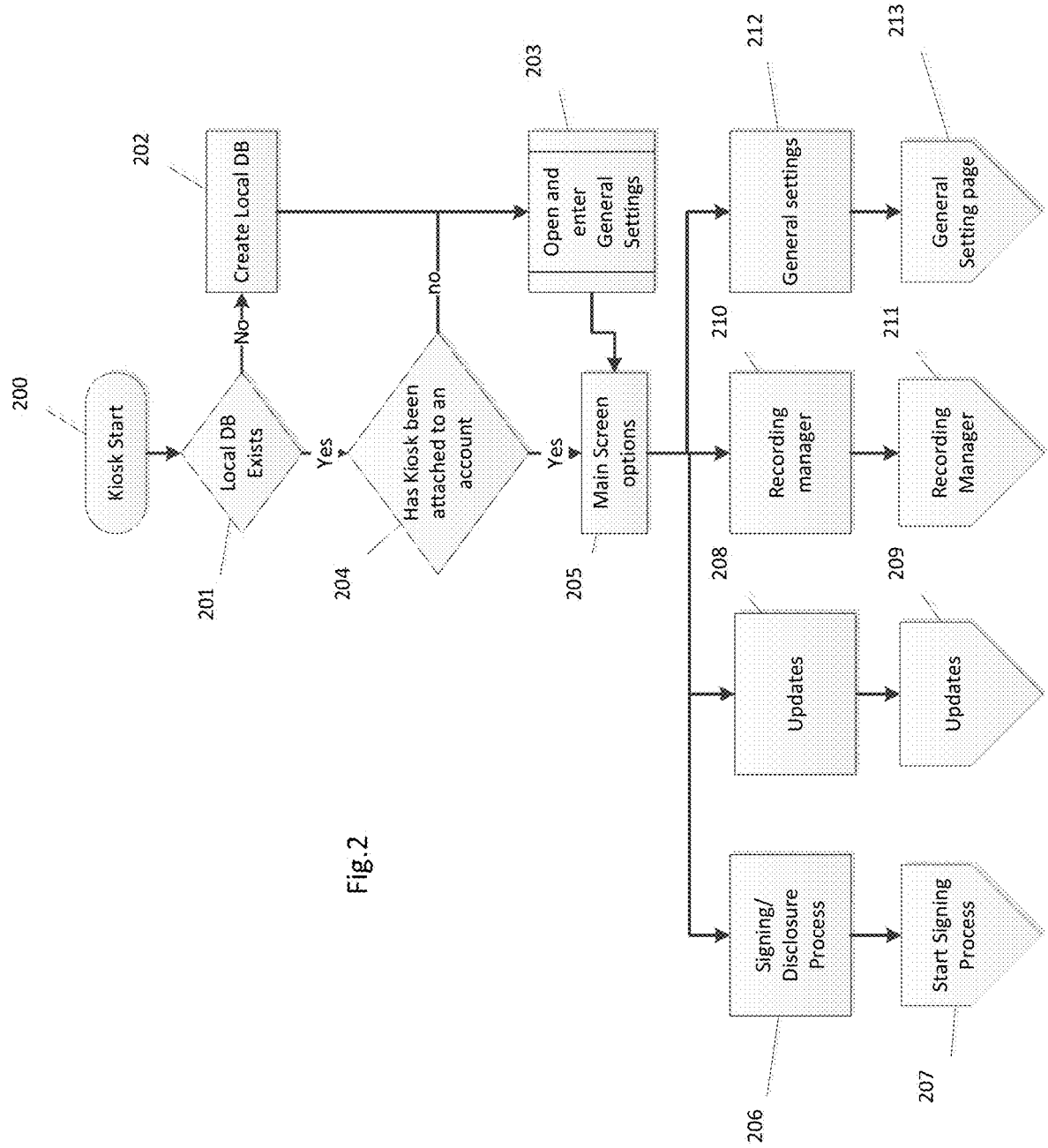
FIG. 2 is a flowchart that shows the initial setup of kiosk and the main screen options available in accordance with an embodiment of a system and method of the invention.

With reference to FIG. 2, confirmation that the kiosk is ready for use begins at 200. The first inquiry 201 is whether a local database exists. If not, then a local database is created 202. The local database is created by opening and entering the general settings portion of the system 203, which is explained in greater detail with reference to FIG. 3.

Figure 3:
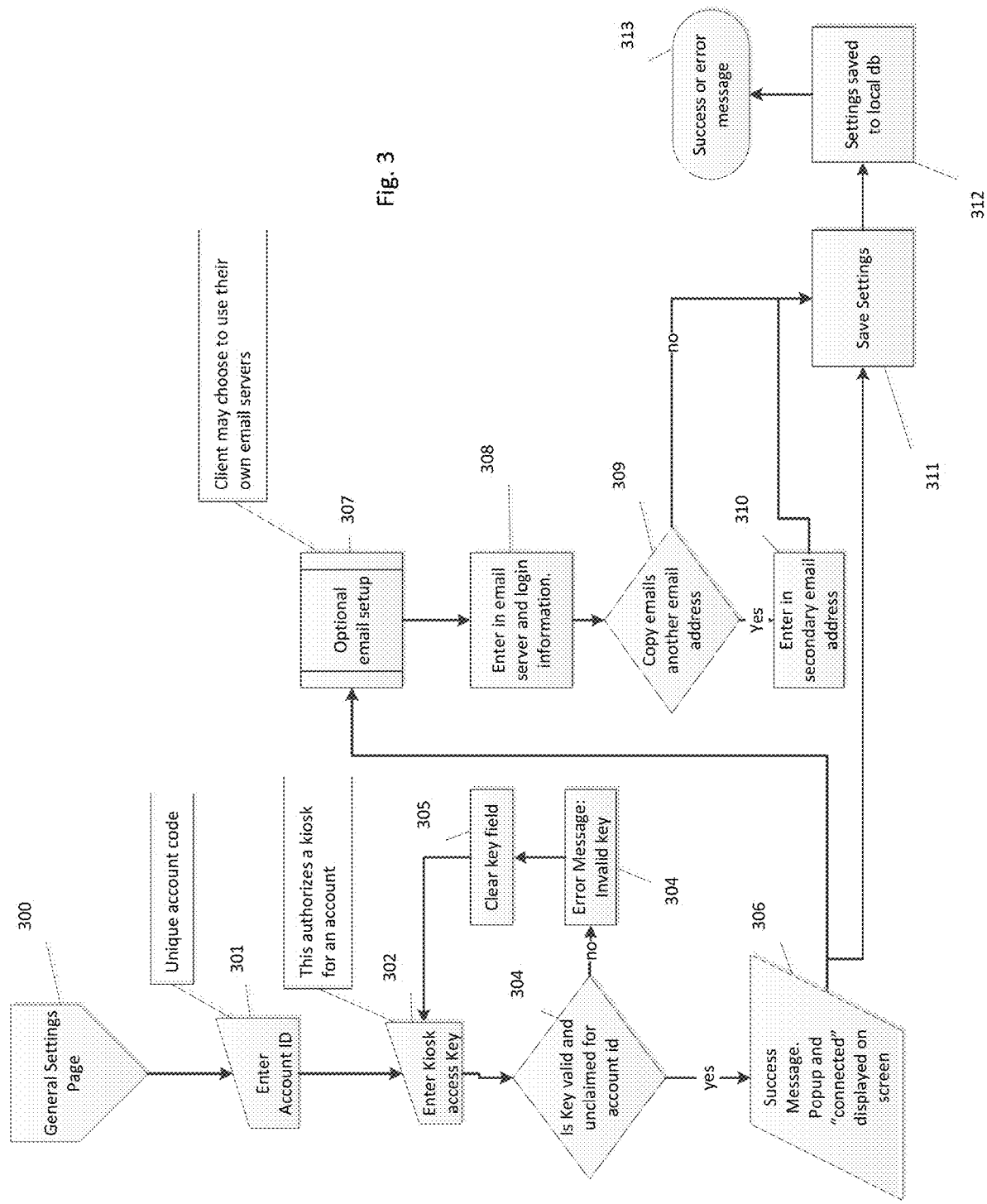
FIG. 3 is a flow chart of general settings routine that may be selected from the main screen options shown in FIG. 2.

With reference to FIG. 3, the general settings page is displayed 300 to the first party or a third party performing services for the first party. A unique account code 301 is entered. The unique code could, for example, identify the parties to the transaction, the documents to be executed, the agent of the first party, the time, date and/or location of the presentation etc. Next, a kiosk access key is entered 302. Verification of the kiosk access key occurs at 303. If the kiosk access key is invalid, an error message is displayed 304 and the kiosk access key field is cleared 305. The kiosk access key may now be reentered at 302 for validation 303. The number of kiosk access key entry/validation attempts may be limited, if desired, to further enhance the security of the system and its users. If the kiosk access key is valid, a success message is provided 306 and an option is provided to proceed to optional e-mail setup 307 or to save the general settings 311 in the system. The settings are saved 312. A message is provided 313 indicating whether the settings were successfully saved or whether an error occurred.

The optional e-mail setup 307 permits a first party or a third party on behalf of the first party to select the e-mail servers that will be used during the transaction. The e-mail server information is entered 308, and e-mail addresses are entered 309, 310 until all e-mail addresses have been entered. This information is saved 311, 312, and a message is generated 313 as described above.

Returning back to FIG. 2, if the local database exists 201 (i.e., completion of the general settings routine referenced in FIG. 3 has been a success), inquiry is made regarding whether the kiosk has been attached to the account 204. If so, main screen options are presented 205. If not, then the general settings routing discussed with reference to FIG. 3 must be entered 203 and successfully completed.

In the embodiment shown in FIG. 2, there are four screen options available, namely entering into a signing/disclosure process 206 or routine, conducting system updates 208, entering into the recording manager 210, and entering into general settings 212. If the general settings option 212 is selected, then the general settings page 213 shown in FIG. 3 at 300 is displayed. If the signing/disclosure process 206 is selected, then the transaction process is initiated 207. The transaction process determines what multimedia presentation is shown to the second party. This is illustrated in greater detail in FIG. 4 beginning at 400.

Figure 4:
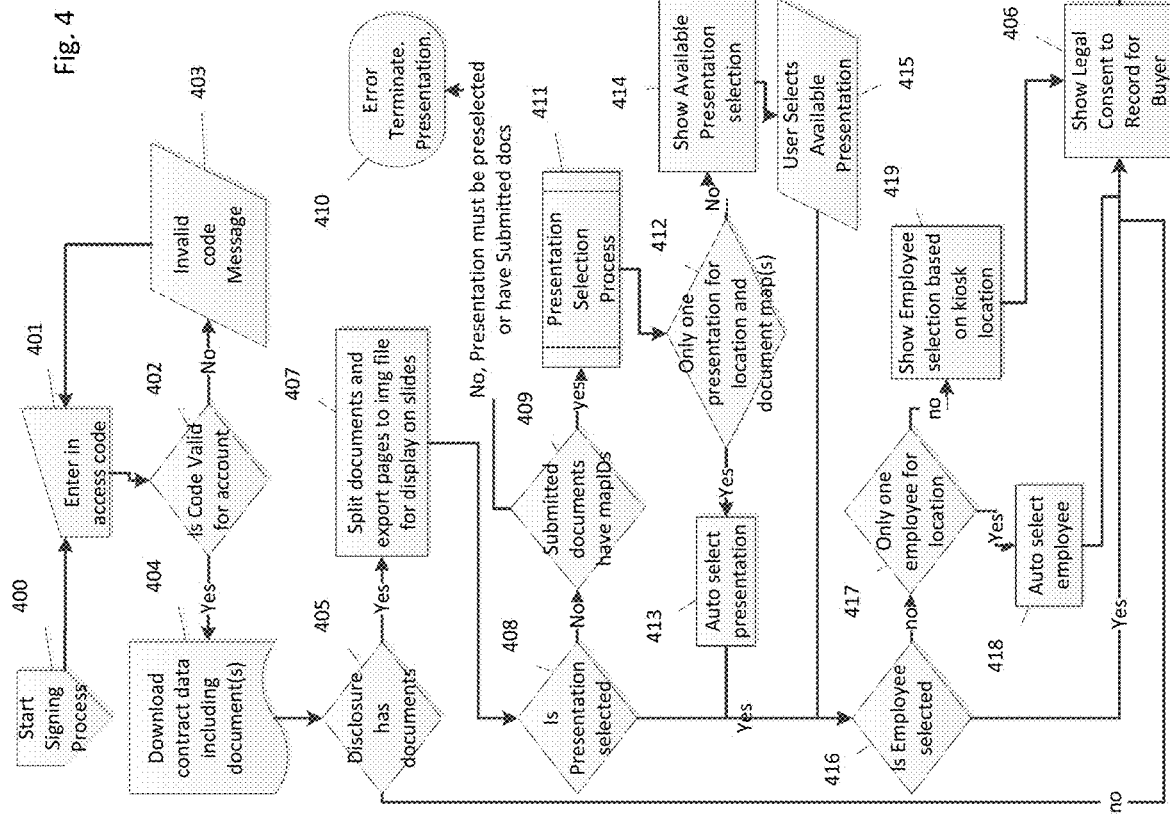
FIG. 4 is a flow chart of the signing process routine that may be selected from the main screen options shown in FIG. 2.
Figure 5:
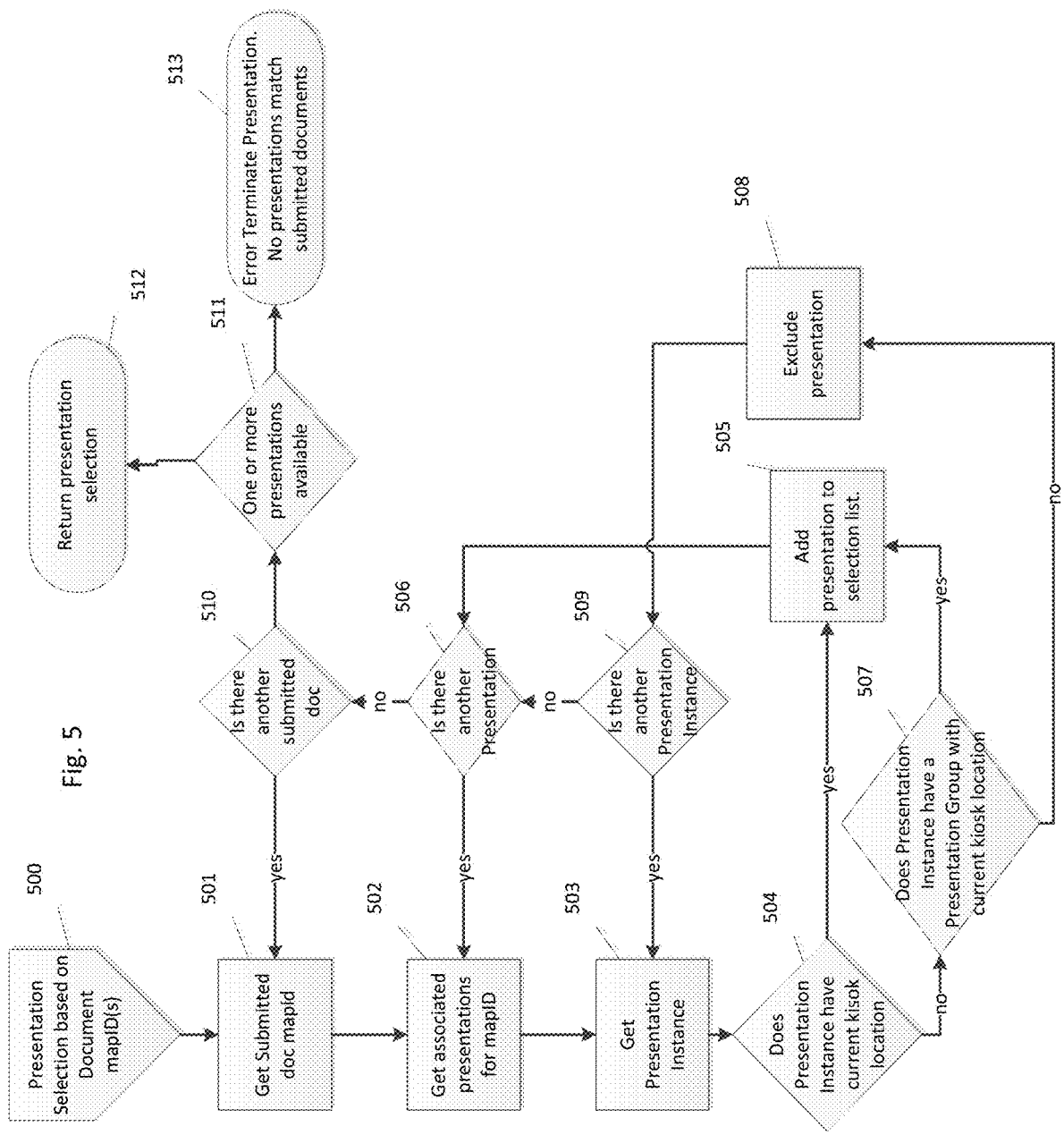
FIG. 5 is a flow chart showing the presentation selection process routine referenced in FIG. 4.

With reference to FIG. 4, after initiation of the transaction process 400, an access code must be entered 401. This code can be the unique account code previously referenced above in 301. The access code is validated 402. If the access code is invalid, a message code is displayed 403 and the access code can be reentered 401. If the access code is valid, all requisite document(s) for the transaction and the associated multimedia presentation are downloaded 404 (e.g., pulled from storage, preferably 150 in FIG. 1) for display on the display terminal at the kiosk. It will be appreciated that in some instances (e.g., when the system is utilized for education or training purposes), there may not be any documents to be executed by the second party. Thus, an inquiry is made 405 regarding whether the multimedia presentation (sometimes referred to herein as the disclosure) includes documents 405. If not, then information required to obtain the legal consent of the second party (sometimes referred to as the "buyer") is displayed at the kiosk 406. If, however, the transaction includes documents to be signed by the second party, the documents are split and pages are exported to an image file for eventual display to the second party 407. Confirmation is made that the proper multimedia presentation has been selected 408. If not, inquiry is made regarding whether the documents have mapID's 409. MapID's, which are also known in the art as document identification codes, provide information about the documents to be utilized in the transaction. For example, mapID's could identify the number of pages that are present in the documents to be executed during the transaction, the size of the document files and/or the location of the documents. The mapID's also provide a mapping of the various fields in the documents where information is to be populated into the forms, which allows for the proper data to be populated in the forms during the transaction. If the documents do not have mapID's, then the multimedia presentation is not ready for presentation to the second party and the presentation is terminated 410. If the documents do have mapID's, then a presentation selection routine 411 is entered. The presentation selection process 411 is illustrated in greater detail with reference to FIG. 5 beginning at 500.

A submitted document is identified by mapID 501 and is selected from a database and associated with a presentation identified by mapID 502. Next, the multimedia presentation instance associated with the document is obtained from storage 503 and an inquiry is made regarding whether the multimedia presentation instance is associated with the kiosk location 504. If so, then the presentation is added to the selection list 505 and inquiry is made 506 regarding whether there are additional presentations to be added. If not, then further inquiry is made regarding whether the presentation instance has a presentation group with the kiosk 507. If so, it is added to the presentation selection list 505. If not, the presentation is excluded 508, and inquiry is made regarding whether there is another presentation instance to be added 509. If so, the next multimedia presentation instances associated with the document is obtained from storage 503. If not, then the routine proceeds to the inquiry 506 regarding whether there are additional presentations to be added. If so, then associated presentations are obtained via mapID's 502. If not, then inquiry is made regarding whether there is another submitted document to be presented during the multimedia presentation 510. If so, the submitted document is identified by mapID 501. If not, then inquiry is made regarding whether one or more presentations are indicated as being available 511. If not, then an error message is transmitted to the display terminal in the kiosk 512 advising that no presentation/document match has been made. If so, the presentation selection process concludes 513 and the signing process (see FIG. 4) continues at 412, where inquiry is made regarding whether only one presentation is to be made. If yes, then the single presentation is auto-selected 413. If no, then additional presentations available for the kiosk are shown 414, and the user can make a selection from the available presentations 415. In both instances, the next inquiry is whether a first party or its agent (both of which are collectively referred to as "employee" in FIG. 4) are selected 416. If so, the legal consent information to record the second party 406 is displayed. If not, then inquiry is made regarding whether there is only one first party 417. If so, that first party is auto-selected 418 and the legal consent information 406 is displayed to the second party. If not, then a list of first parties is displayed 419, and legal consent information 406 is displayed to the second party after one or more first parties have been selected.

Inquiry is next made regarding whether there are more second parties to the transaction 420 (the second parties are referred to as a "buyers" in FIG. 4). If there is more than one second party to the transaction, the legal consent to record information is recorded for each second party present 406. If not, the second party is shown a tutorial 421 using the display terminal. The signature of the second party and the first party are captured 422 (it is possible that the first party's signature and/or initials are "pre-captured" before the transaction and retained in storage, although this is generally not preferred). Inquiry is made regarding whether there are additional second parties 423, and if so, their signatures are captured 422. If not, then the multimedia presentation commences 424. Presentation slides are selected for presentation to the second party 425 in accordance with a presentation slide selection routine, which is shown in FIG. 6 beginning at 600.

Figure 6:
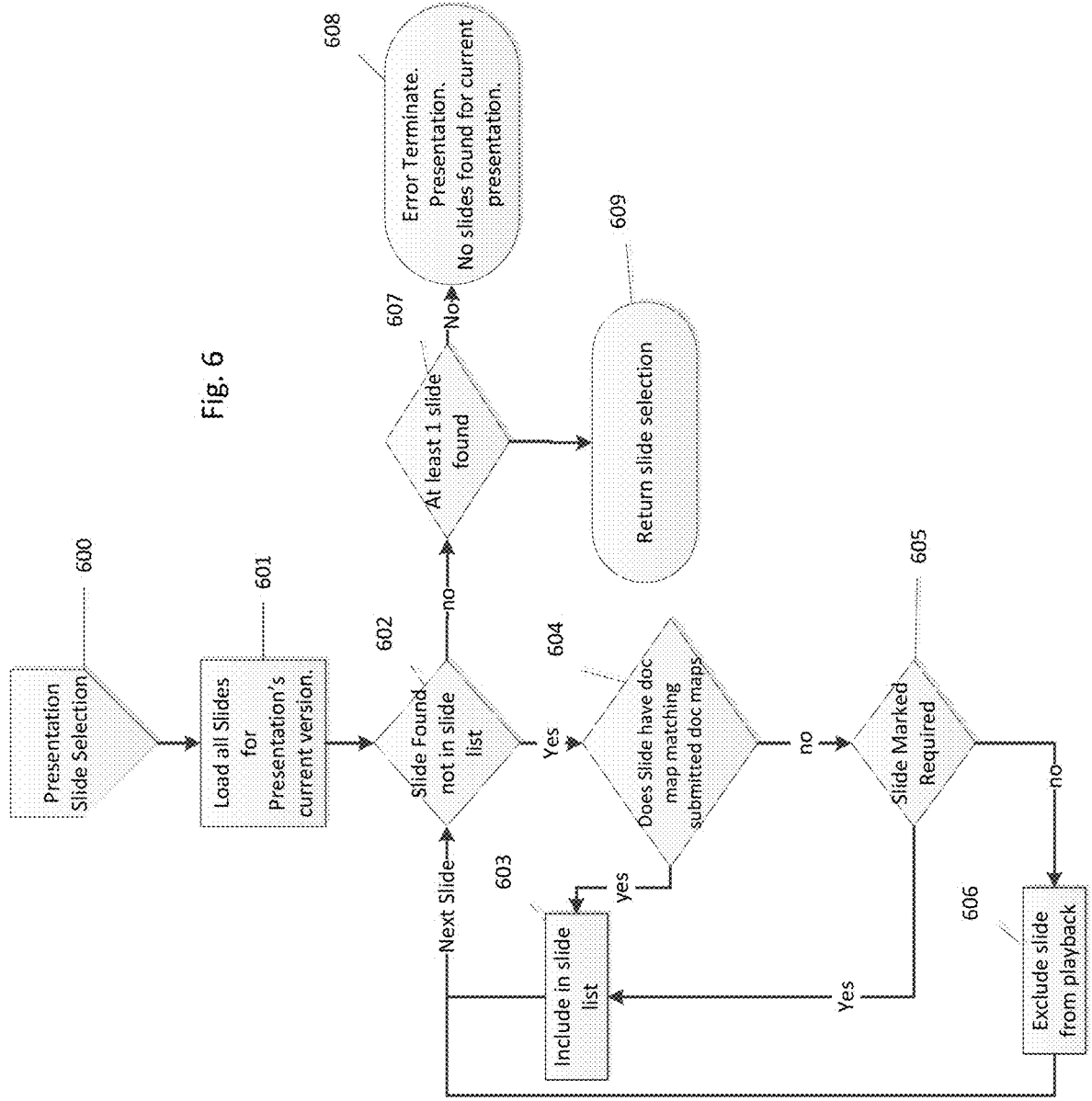
FIG. 6 is a flow chart showing the presentation slide selection routine referenced in FIG. 4.

With reference to FIG. 6, all slides for the presentation are loaded 601 for sequential processing in 602. During processing, inquiry is made in 602 whether there are any slides found in the load of slides from 601 that have not yet been included in the slide list to be presented to the second party (the inclusion determination is made in 604). If there are slides found in the load of slides from 601 that have not yet been included in the slide list, for each such slide inquiry is made regarding whether the slide has a matching submitted document by mapID 603. If so, the slide is included in the slide list 604, and the next slide is considered 602. If the slide does not have a matching submitted document by mapID, then inquiry is made regarding whether the slide is required to be presented during the multimedia presentation to the second party 605. If so, the slide is included in the slide list 604. If not, the slide is excluded from the presentation 606. As noted above, inquiry is made in 602 until all of the slides in the load from 601 have been processed and there are no slides found in the load from 601 that have not yet been included in the slide list. When this occurs, at 607 inquiry is made regarding whether at least one slide has been included in the slide list to be presented to the second party (i.e., the determination made at 604). If so, then the system returns to signing process 609 with the included/selected slides at the next inquiry, namely whether there are any slides after the slide selection process 426 (see FIG. 4). If not, then the presentation is terminated due to an error 608, namely that there are no slides included/selected to be presented to the second party.

Returning again to FIG. 4 and particularly to the inquiry regarding whether there are any included/selected slides after the slide selection process 426, if not, a messages is displayed 427 advising that the presentation is not properly set up, and the presentation is ended 428. If slides are selected, then the slide playback routine 429 commences. This is explained in greater detail with reference to FIG. 7, beginning at 700.

A slide is loaded at 700 and displayed to the second party on the display device. Inquiry is made regarding whether the slide loaded is the first slide 701 in the presentation. If so, then inquiry is made regarding whether the first party's signature block appears on the document associated with the slide 702. If so, the first party's signature is added to the document 703. If not, then navigation controls available to the second party are disabled 704, and the document is displayed on the display terminal to the second party 705. Inquiry is made regarding whether there is a summary of the document as part of the multimedia presentation to be presented to the second party 706. If so, the summary is presented to the second party 707, and the second party is prohibited from skipping or cancelling the presentation. The second party can temporarily halt (pause) playback of the presentation, if desired. After the summary has been presented to the second party, or in the event there is no summary of the document, inquiry is made regarding whether there is a detailed explanation of a portion of the document 708, which is referenced as a chapter video in FIG. 7. If so, all chapter videos are presented to the second party sequentially, which provide information regarding the content of the document 709 (e.g., terms, conditions, consequences etc.). During the first playback, the second party cannot skip any portion of the presentation, but can pause it. Once it has been fully presented, the second party has the option to select terms for repeated playback or select more information, if available. If there is no summary and no detailed presentation relating to a document that is part of the transaction, then an error message is displayed 710. If at least one of a summary and/or a chapter video has been presented to the second party, then the signature and initials of the second party are captured 711 using a signature capture device, as described above.

Inquiry is then made regarding whether the second party's initials are required to be affixed to the document 712. If so, the second party is requested to consent to the attachment of the second party's initials to the document 713 using the interface. If the second party withholds consent, no transaction is entered into between the first party and the second party and the process concludes. If the second party consents, the second party's initials are added to the document and inquiry is made regarding whether the second party's signature is required to be affixed to the document 714. If so, the second party is requested to consent to the attachment of the second party's captured signature to the document 715 using the interface. If the second party withholds consent, no transaction is entered into between the first party and the second party and the process concludes. If the second party consents, the second party's captured signature is added to the document and inquiry is next made regarding whether there is an additional second party (referred to as a "CoBuyer" in FIG. 7) to the transaction whose initials are required on the document 716. If so, the additional second party is requested to consent to the attachment of the additional second party's initials to the document 717. If the second party withholds consent, no transaction is entered into and the process concludes. If the second party consents, the additional second party's initials are added to the document and inquiry is made regarding whether the additional second party's signature is required to be affixed to the document 718. If so, the additional second party is requested to consent to the attachment of the additional second party's captured signature to the document 719 using the interface.

If the additional second party withholds consent, no transaction is entered into and the process concludes. If the additional second party consents, then the additional second party's signature is added to the document and inquiries are made for additional second parties (see 720, 721, 722 and 723 etc.) and/or other parties, such as co-signers or guarantors (see 724, 725, 726, 727 etc.). It will be appreciated that the request for consent to add signatures to the document continues until all signatures have been requested and consent has been provided.

Inquiry is ultimately made regarding whether all initials and/or signatures required for the document have been captured and added to the document 728. If not, the process begins again at 711. If so, navigation buttons are made available to the second party 729 allowing the second party to proceed. Inquiry is then made regarding whether there are additional slides in the presentation 730. If so, the second party is permitted to input commands to continue forward or backward 731 using the interface. If the second party elects to proceed forward, the next slide is loaded and the process resumes at 700. For every slide except the first slide, the response to the inquiry at 701 will be no. In this event, at 732 the repeat slide playback routine commences, which is described in greater detail in FIG. 8 beginning at 800.

Figure 7:
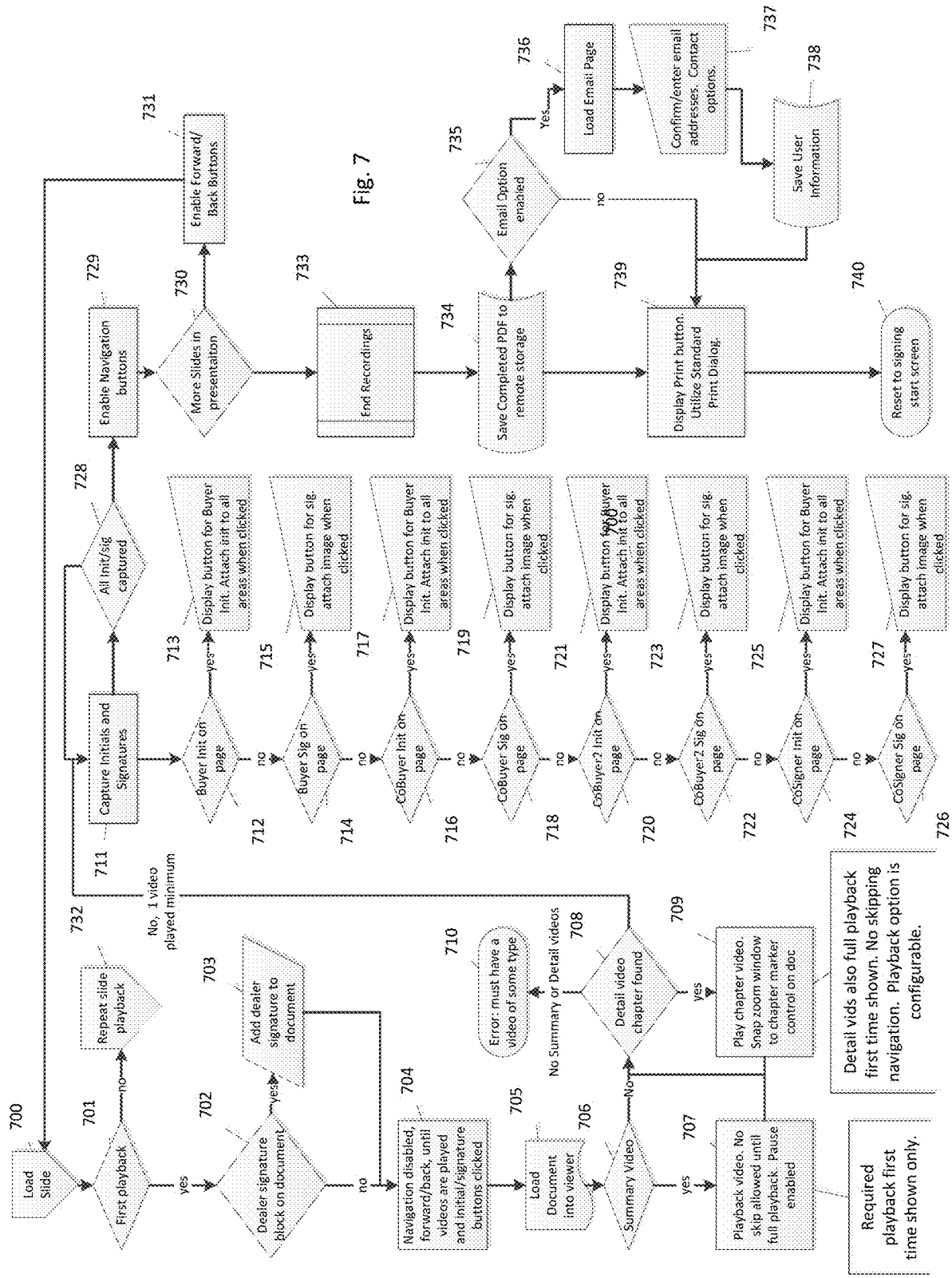
FIG. 7 is a flow chart showing the slide playback routine referenced in FIG. 4.
Figure 8:
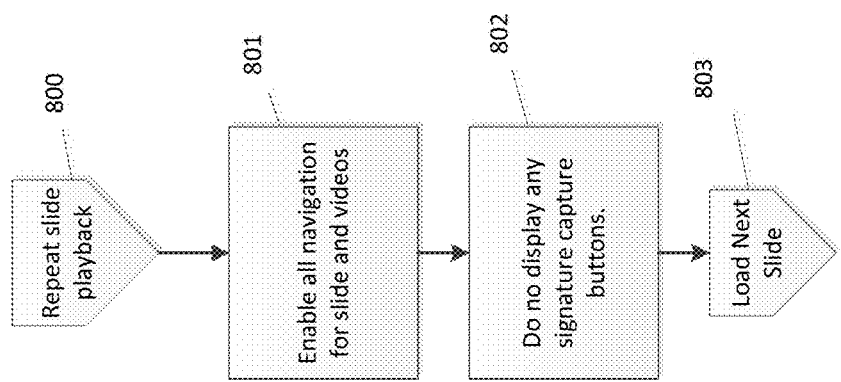
FIG. 8 is a flow chart showing the repeat slide playback routine referenced in FIG. 7.
Figure 9:
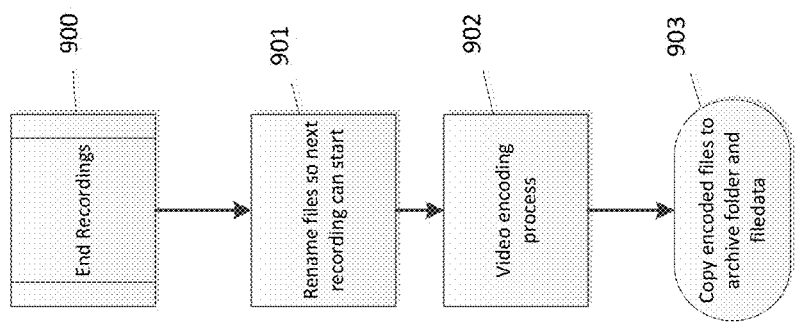
FIG. 9 is a flow chart showing the end recordings routine referenced in FIG. 7.

The repeat slide playback routine is identical to the initial slide playback routine described in FIG. 7 with reference to 705-709 and 712-730. But all navigation is available to the second party from the outset (other than to skip over required multimedia presentations) 801, and signature capture operations 702, 711 are omitted 802 because the signatures of the parties have already been captured. The repeat slide playback routine continues by loading the next slide 803, which returns to 700 in FIG. 7 and continues until the response to inquiry 730 is that there are no additional slides in the presentation. At that point, the recordings end 733, and the end recordings routine begins. This is illustrated in FIG. 9, beginning at 900.

Once the recording has concluded at 900, the files are renamed 901 so that the next recording at the kiosk can commence. A video encoding process 902 is conducted, to create a record of the second party during the transaction and the multimedia presentation that was presented to the second party during the transaction. This recording is encoded and placed into an archive 903 in storage, with details of the storage location and record entered into a database.

After the recording has been concluded 733 (see FIG. 7), the documents bearing the signatures of the parties are saved in an appropriate digital file format (e.g. as PDF files). Inquiry is made regarding whether e-mail addresses were provided 735 as previously described with reference to FIG. 3 (see 307-310). If so, then an e-mail page is loaded 736, the e-mail addresses are confirmed 737, and the confirmed information is saved 738 and the e-mail is sent. An option is provided to the second party to print a copy of the signed documents 739. Once optional printing has been completed, the process concludes 740, all systems are reset, and the kiosk is available for use again (see FIG. 2, at 200).

Figure 10:
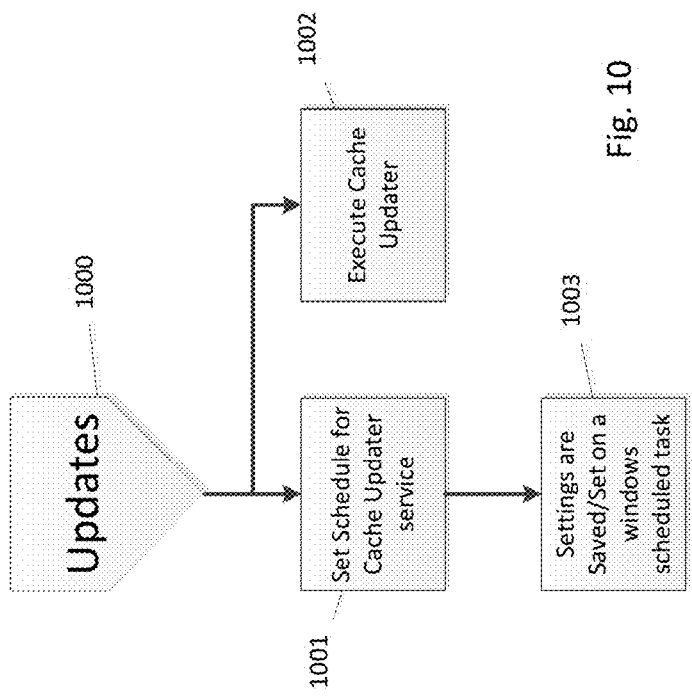
FIG. 10 is a flow chart showing updates that may be selected from the main screen options shown in FIG. 2.

With reference to FIG. 2, there is also an updates manager 208 as one of the main screen options. When this is selected 209, an updates routine is commenced as shown in FIG. 10 at 1000. In the updates routine 1000, a set schedule is set for a cache updater service 1001. This cache execute updater is conducted on the schedule 1002. After updates, the settings are saved 1003. It will be appreciated that other settings, routines, and software maintenance can also be made in this manner, as needed.

Figure 11:
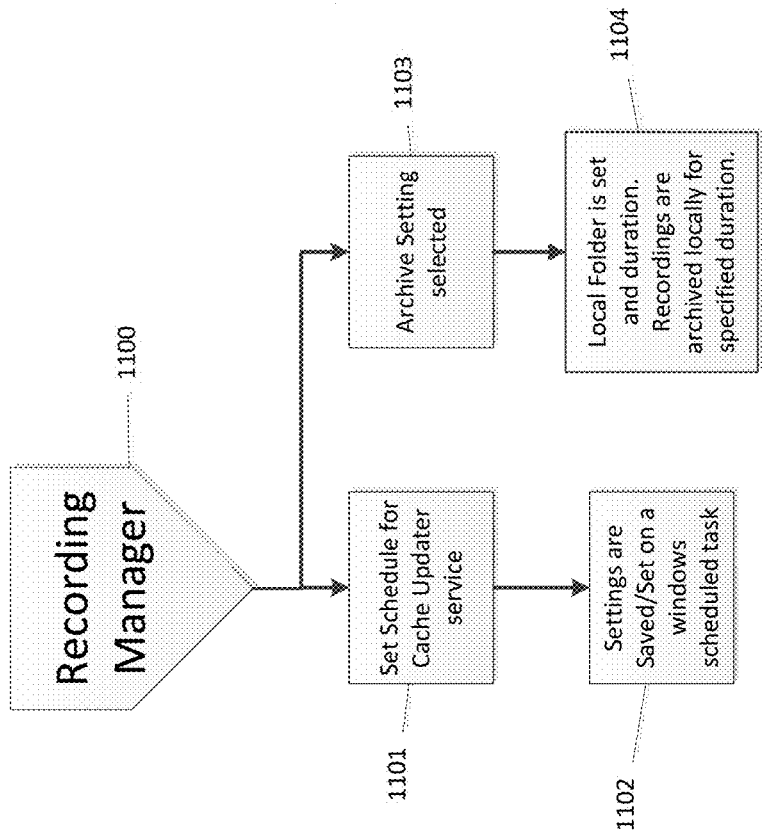
FIG. 11 is a flow chart showing the recording manager that may be selected from the main screen options shown in FIG. 2.

Again, with reference to FIG. 2, there is also a recording management 210, which can be selected 211 from the main screen options. The recording manager is shown in FIG. 11, and commences at 1100. The recording manager includes a set schedule for cache updater service 1101, and settings are saved after completion 1102. The recording manager also includes an archive setting feature 1103, which determines the duration for which recordings of transactions are retained, or moved to alternative storage locations.

Figure 12:
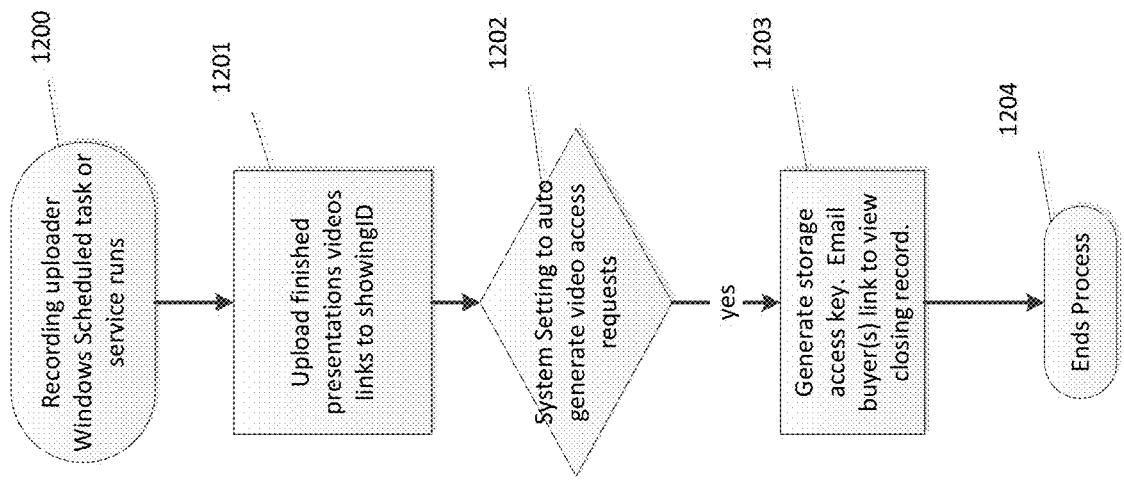
FIG. 12 is a flow chart showing the logic of a recording uploader routine that can be established for a system and method according to one embodiment of the invention.

FIG. 12 shows an optional recording uploader function, which can be part of the system. The recording uploader can be initiated 1200 as a scheduled task or upon specific commands. The recording made of the multimedia presentation and second party during the transaction can be uploaded to storage accessible via the Internet using an FTP link 1201. An inquiry can be made to determine whether recording access links should be auto-generated 1202. If so, an access key is generated 1203 and e-mailed to the second party, who can download and view the recording of the transaction. The process concludes at 1204.

Figure 13:
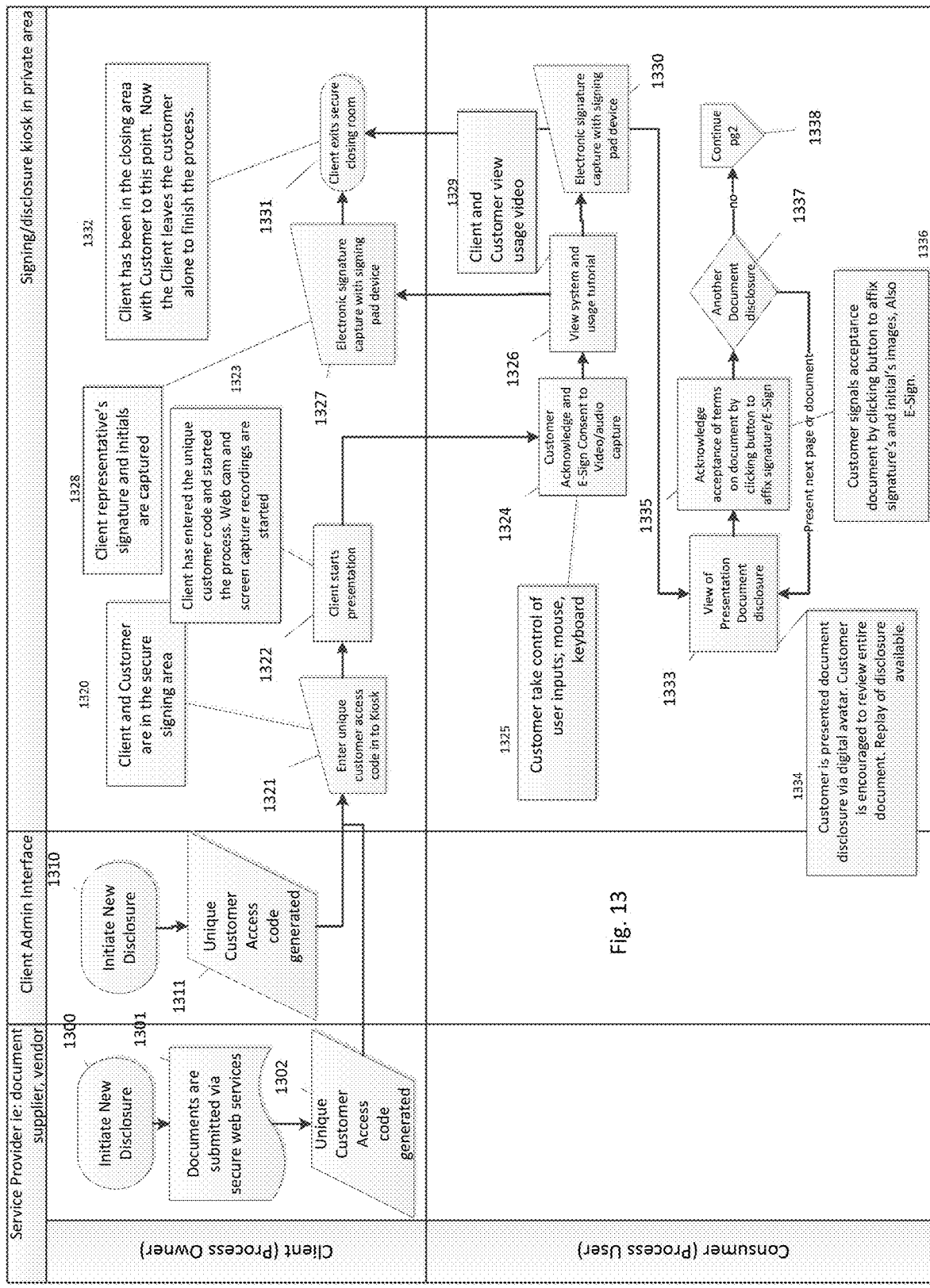
FIGS. 13-14 together constitute a flow chart that provides a summary/overview of an embodiment of a system and method of the invention.
Figure 14:
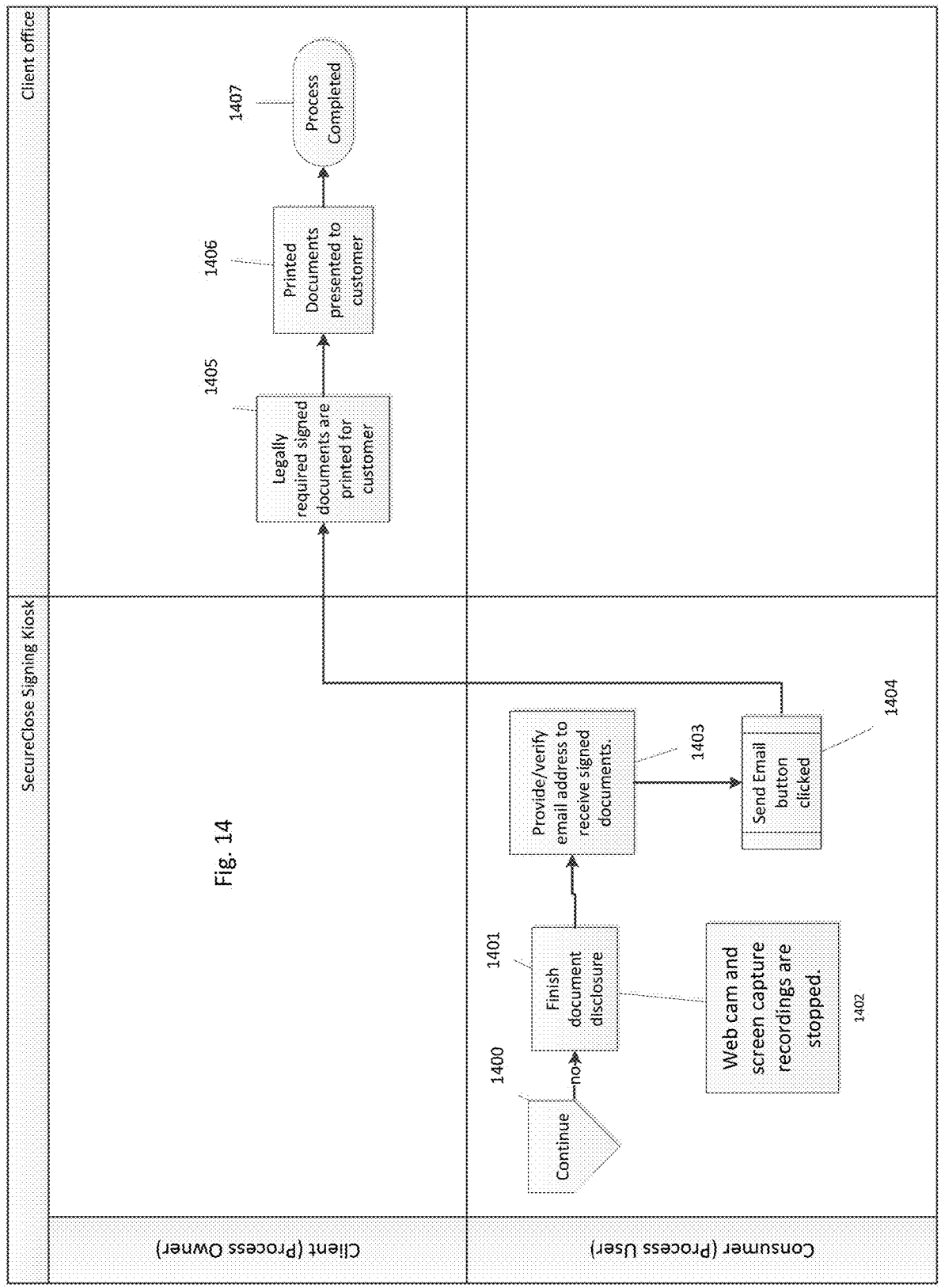

FIGS. 13 and 14 provide an overview or summary of a transaction conducted using an embodiment of a system and method according to the invention. In this embodiment, a third party service provider such as a document supplier or other vendor initiates a new disclosure 1300. Documents that are suitable for a particular transaction (e.g., documents that have been reviewed by experts to confirm that they meet minimum legal requirements and are suitable and complete for a particular transaction) are submitted via a secure web service 1301 to storage, and information regarding the documents is placed into an associated database. A unique customer access code is generated 1302, which must be provided in order for access to be granted to the documents.

A transaction validation service provider who has a relationship with the third party service provider who prepared the documents, initiates a new disclosure for a first party 1310 (in FIG. 13 the first party is referred to as a "Client"), which may be a retailer, insurance company, government agency or any other first party. A unique access code is provided to the first party 1311, and the access code allows the first party to access the documents prepared by the third party service provider for use in transactions with second parties. The documents can come from the third party document vendor's servers or, more preferably, can come from the transaction validation service provider's servers (the transaction validation servicer provider having previously obtained the documents from the third party document vendor).

When the first party desires to enter into a transaction with a second party (in FIG. 13, the second party is referred to as a "Customer"), both the first party or its agent and the second party enter into a kiosk 1321, which as indicated in comment 1320 is a secured signing area. The unique customer access code provided by the transaction validation service provider is entered at the display terminal in the kiosk 1321, and the first party or its agent initiates the automated transaction process 1322, which includes a multimedia presentation. As noted in comment 1323, recordings of the second party commence at the start of the presentation. The second party is asked to acknowledge that a recording is being made 1324, and provide consent and signature advising of the same using an interface as noted in comment 1325. The second party views a tutorial regarding operation of the system and how to use it 1326. And, then the first party or its agent uses a signature capture device 1327 to capture the first party's signature and/or initials as indicated in comment 1328. After the second party has completed viewing the tutorial 1326, which is preferably done in the presence of the first party or its agent 1329, the second party uses a signature capture device 1330 to capture the second party's signature and/or initials. At this point in the transaction process, the first party and/or the agent of the first party exits the kiosk 1331. As noted in comment 1332, this leaves the second party alone in the kiosk to observe the multimedia presentation and complete all documents required to enter into the transaction with the first party.

The second party thus views the presentation of documents and the associated multimedia presentation that explains the content thereof 1333. As noted in comment 1334, the multimedia presentation is preferably disclosed to the second party via a digital avatar, and the second party can use the interface associated with the display to control attributes of the multimedia presentation and to obtain additional detailed information. Once the second party has acknowledged understanding and acceptance of the terms of a document, the second party is requested 1335 to authorize the affixation of the second party's signature and/or initials to the document. As indicated in comment 1336, once the second party signals acceptance using the interface, the second party's signatures are added to the document and displayed to the second party on the display terminal. This process is repeated 1337 until there are there are no other documents to be presented and/or signed and the document disclosure process is completed 1401 (box 1338 in FIG. 13 is the same as box 1400 in FIG. 14, which is a continuation of FIG. 13). As indicated in comment 1402, the recording of the second party ceases at this point. The second party is asked to verify the second party's e-mail address 1403 in order to receive signed copies of the transaction documents. Once the information has been verified, an e-mail is sent 1404. The first party or its agent can print 1405 a set of the signed transaction documents and provide the same to the second party 1406. At this point, the entire secure, validated transaction process is complete 1407.

Miscellaneous Technical Attributes.

The system software can be built on Microsoft's .NET software framework, or on other software frameworks (e.g., Linux or SUN). Various parts of the system can be cloud-based, and can be deployed on Windows Azure and follow the Software as a Service (SaaS) delivery model. The system can be also deployed and hosted on Internet information server (IIS) Windows.

The core application can be hosted at a data center. All other components are adapted to utilize and interface with the core application. The core application is preferably configured to handle and manage information across multiple data platforms and to integrate such data to compile multimedia presentations and conduct validated transactions.

A Windows Communication Foundation (WCF) Web Service can take on the majority of the application workload. Communications with the web service can be done using Representational State Transfer (REST) and/or OData architecture. This allows for reusability across multiple platforms.

An administrator portal can be a web application built on frameworks such as ASP, .NET, MVC. The C #programming language can be used for server-side scripting, and JavaScript and AJAX can be used for client-side scripting. Through the administration portal, customer administrators are able to perform account and user management, as noted above.

Microsoft's Silverlight can be utilized to deliver the multimedia presentation to the buyer during the closing.

Silverlight has video streaming capabilities and fluid interface animations. Silverlight can provide a rich user experience that is intuitive and similar to desktop application, which the buyer likely has encountered during his or her lifetime.

The following examples are intended only to illustrate the invention and should not be construed as imposing limitations upon the claims.

EXAMPLE

Auto dealerships are provided with administrative log in credentials to a web site, which allows the dealerships to create secondary (i.e., more limited), logins for various employees to initiate sales contracts within the portal. The secondary logins are for use by closing agents of the dealerships. The administrative portal consists of three major areas: Company Setup; Document Setup; and Sale Setup. Each dealership is permitted to access a separate, secure database established for storing the dealership's default data in each of the three categories.

An administrator has access to set the company default data. Examples of default data include the dealership's name, address, Employer Identification Number (EN), sales tax rates, dealer document fees, dealer registration fees, title fees etc. Also, if there is a default finance company the dealership works with, the dealer can set such finance company as a default, as well as the standard interest rate this company charges. Once this information is entered and saved, it becomes the default information filled into each new sale, unless the closing agent elects to change it at the buyer's request.

The database includes a core set of legal and compliant documents, which are stored as templates that can be populated with inputted buyer data. These forms are tailored to each state's laws, to provide a state and federally compliant sale closing. The administrator of the dealership has the ability to view all document templates, as well as any location specific forms that may need to be included at the closing. The templates include all static data, and leave spaces for the buyer's name, address, date of birth, driver's license number, vehicle information, finance information, etc., that are populated using the data in the buyer-specific database that is generated for each sale. The administrator has the ability to add or remove spaces for digital signatures on each form, and update verbiage, if necessary. This section is preferably locked to the administrative portal because there should be no reason for the dealership to change this information after the initial review.

To populate the information necessary for each document utilized at closing, a buyer-specific database must be created. This is done by either manually entering the information into the or by exporting the desired information using a bridge (also known in the art as an Application Programming Interface or API) from a dealer management system (DMS). Most dealerships input all their customer information into their DMS, so by exporting the data with a bridge avoids a double-entry and potential errors that can occur thereby. Example information entered in the buyer-specific database is buyer name, address, date of birth, driver's license number, credit score or interest rate qualifications, Social Security number etc. Whether manually entered or exported from a DMS, this customer table is built with all information necessary to render the completed documents for signature. Once all information is entered into the system and the customer database table is adequately filled out, the administrator or closing agent is able to 'Create the Sale.'

They do this by selecting all necessary forms to be displayed in the media presentation to the customer. By default, the minimum documents required to close the transaction are selected, but the closing agent has the ability to add additional location specific forms shown based on the sale. Once the sale is created, the necessary forms are compiled in order, and the appropriate multimedia presentation accompanying each form is paired with each document. For example, if the first document is a privacy notice, the system pairs the audio/video presentation for the privacy notice with that form so they are displayed side-by-side to the buyer during the closing. The completed sale also generates a 'Sale Code', which is an alphanumeric code sequence that corresponds directly to the newly created sale.

This is given to the closing agent, so that they can display the relevant closing presentation to the buyer. The administrator has access to view the completed sales and retrieve the Sale Codes as necessary as well. For every form in the system, there is a corresponding multimedia presentation.

The dealership preferably has a dedicated area/room ("kiosk") in their location utilized exclusively for closings using the system and room camera monitoring device. In this embodiment, the room houses a dedicated, all-in-one computer system, which includes a display unit that is preferably quite large (e.g., 21" to 24" measured diagonally) and includes a front-facing camera capable of recording audio and video in the top-middle portion of the display. This unit will also have a keyboard and pointing device to receive user input, as well as a digital signature pad connected to the computer to receive electronic signatures from the buyer and co-buyer (as necessary) and receive the command from them to affix those signatures to the form in question. The system will also include a "Call Button" affixed to the desk (or otherwise within the system) in the room, allowing the buyer to "Page" the closing agent if there are additional questions beyond what is explained in the presentation. It will be appreciated that other hardware could be utilized (e.g., iPad's, display terminals with non-integrated cameras etc.).

Using one of the Closing Agent log in's created from the administrative portal, the closing agent logs into the client side portal of a website associated with the system, and is prompted to input the 'Sale Code' provided by the administrator. Once the Sale Code is entered, the closing presentation begins, and the buyer cannot leave the presentation once it has begun until it has completed the final form (unless the buyer decides not to complete the transaction). The buyer is shown the document in question on the left side of the screen, and the multimedia presentation on the right.

The presentation for each form gives an explanation of what the form in question is and what they are agreeing to. If the customer requires further explanation, it can be requested and then provided, preferably while keeping the document showing on the left side of the screen. While the presentation runs, the form may be explained section by section; while a colored overlay (or section zoom) is displayed on the document so what is discussed is brought to the fore-front. Once the presentation has completed to the buyer's satisfaction, the buyer will be prompted to add their digital signature and/or initials to the form, signifying full understanding and acceptance, before they can move on to the next form. The buyer is encouraged NOT to sign any document if questions persist, but to call the closing agent using the Call Button and have their concerns addressed.

Once the presentation is completed and all the forms have the necessary signatures, the buyer is prompted to enter an email address. Once they have done this, an electronic copy of the finalized forms (including signature) may be emailed to them, along with an access code to log into the associated website and view the Recording Output of their closing (for a set amount of time, potentially 30 days.)

While the closing presentation is in process, there are two separate captures taking place: The system is recording a screen-capture of everything happening on the screen (the audio/video displayed, everything the user clicks, etc.) and saving it to a file on the local computer. Additionally, the front-facing camera built into the system is capturing audio and video of the customer's face as they move through the presentation, and potentially the room camera video associated during the event. If at any time the closing agent comes into the room to provide further explanation, this is captured through this system as well. Both of these recordings begin the minute the presentation begins displaying, so they are time-synced together. The system takes these two captures and displays them side by side (e.g., the screen capture on the left, and the customer recording on the right) along with the text data displaying the customer's name, date, selling dealership, and closing agent along the bottom beneath the videos. In other embodiments, the videos could be merged. The output videos are kept securely on remote servers and can be accessed, as necessary, locally, and monitored for all access types. The remote user will receive an access code to review their closing for a defined period of time (potentially 30 days).

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A system for validating a transaction between a first party and a second party, the system comprising:
    a compiler module configured to select a plurality of documents stored for the transaction from an associated documents storage, said plurality of documents including at least one document to be signed by the second party to close the transaction, wherein the compiler module is further configured to compile the selected documents for presentation to the second party as part of a multimedia presentation prepared by or for the first party, said multimedia presentation including an explanation of one or more terms set forth in said at least one document to be signed by the second party to close the transaction;
    a kiosk configured to isolate the second party from outside distractions while the multimedia presentation is presented to the second party, said kiosk including a display terminal, an electronic signature capture device, a recording device, and an interface, wherein
        the display terminal is configured to display the multimedia presentation to the second party;
        the electronic signature capture device is configured to capture a signature of the second party in digital format for association with the at least one document upon the second party's consent;
        the recording device is configured to acquire audio and video of the second party observing the multimedia presentation on the display terminal; and
        the interface is operatively associated with the display terminal and is configured to allow the second party to execute a command to associate the captured signature of the second party with the at least one document to be signed upon the second party's consent and thereby obtain at least one executed document to close the transaction; and
    a data storage operatively associated with the recording device for storing the audio and video acquired by the recording device of the second party observing the multimedia presentation on the display terminal during the transaction, and operatively associated with the interface for storing the at least one executed document.

2. The system according to claim 1, wherein the data storage is located remote from the kiosk.

3. The system according to claim 2, wherein the kiosk further comprises a call button configured to permit the second party to summon the first party or an agent of the first party to come to the kiosk to confer with the second party.

4. The system according to claim 2, wherein the kiosk is isolated in a room that separates the second party from distractions during the multimedia presentation.

5. The system according to claim 2, wherein the kiosk is in a form of a stall having sidewalls that block the second party's forward, left and right views outside of the stall when the second party is positioned in front of the display terminal.

6. The system according to claim 1, wherein the explanation of one or more terms set forth in said at least one document is presented by an avatar displayed on the display terminal.

7. The system according to claim 6, wherein the interface is configured to allow the second party to control any one or more of a language of the multimedia presentation, a pace of the multimedia presentation and an appearance of the avatar.

8. The system according to claim 1, wherein the recording device is configured to capture a view of at least a face of the second party and audible sounds emitted by the second party.

9. The system according to claim 1, wherein an audio portion of the multimedia presentation is presented to the second party via speakers associated with the display terminal or via headphones worn by the second party.

10. A method for validating a transaction between a first party and a second party, the method comprising:
    selecting a plurality of documents stored for the transaction from an associated documents storage, said plurality of documents including at least one document to be signed by the second party to close the transaction;
    compiling the selected documents for presentation to the second party as part of a multimedia presentation prepared by or for the first party for presentation to the second party, said multimedia presentation including at least one document to be signed by the second party to close the transaction, and an explanation of one or more terms set forth in said at least one document to be signed by the second party to close the transaction;
    isolating the second party in a kiosk, the kiosk including a display terminal, an interface, an electronic signature capture device, a camera, and a microphone;
    capturing a digital signature of the second party with the electronic signature capture device;
    validating the transaction in the kiosk by,
        a) displaying the multimedia presentation to the second party on the display terminal;
        b) optionally, allowing the second party to control any one or more of a language of the multimedia presentation, a pace of the multimedia presentation and an attribute of the multimedia presentation using the interface; and
        c) allowing the second party to execute a command using the interface to associate the electronic signature of the second party with the at least one document upon the second party's consent and thereby obtain at least one executed document; and d) displaying the at least one executed document to the second party using the display terminal;

saving the at least one executed document in a digital file format in a data storage;

recording audio and video of the second party observing the multimedia presentation during the transaction using the microphone and camera; and storing the audio and video recording of the second party observing the multimedia presentation during the transaction in the data storage.

11. The method according to claim 10, wherein the data storage is located remote from the kiosk.

12. The method according to claim 10, wherein the explanation of one or more terms set forth in said at least one document is presented by an avatar displayed on the display terminal.

13. The method according to claim 12, wherein the attribute of the multimedia presentation that can be controlled by the second party is one or more selected from the group consisting of a language of the multimedia presentation, a pace at which the multimedia presentation is presented to the second party, and an appearance of the avatar.

14. The method according to claim 13, wherein the at least one document to be signed by the second party is selected for the transaction based upon transaction information provided by the first party.

15. The method according to claim 10, wherein the camera is configured to capture a view of a face of the second party and the microphone is configured to capture audible sounds emitted by the second party.

16. The method according to claim 10, wherein the kiosk is isolated in a room that separates the second party from distractions during the multimedia presentation.

17. The method according to claim 10, wherein the kiosk is in a form of a stall having sidewalls that block the second party's forward, left and right views outside of the stall when the second party is positioned in front of the display terminal.

18. The method according to claim 10, wherein the kiosk includes speakers or headphones, and an audio portion of the multimedia presentation is presented to the second party via the speakers or via the headphones worn by the second party.

19. A non-transitory computer readable medium comprising instructions that when executed by a processor perform actions comprising:

sending transaction information relating to a transaction between a first party and a second party to a compiler module upon receipt of a command from the first party or an agent of the first party;

selecting a plurality of documents stored for the transaction from an associated documents storage by the compiler module, said plurality of documents including at least one document to be signed by the second party to close the transaction compiling the selected documents by the compiler module for presentation to the second party as part of a multimedia presentation prepared by or for the first party, said multimedia presentation including an explanation of one or more terms set forth in said at least one document to be signed by the second party to close the transaction displaying the multimedia presentation compiled by the compiler module on a display terminal to the second party isolated in a kiosk;

capturing a digital signature of the second party using an electronic signature capture device that is operatively associated with the display terminal;

optionally, allowing the second party to control an attribute of the multimedia presentation;

allowing the second party to execute a command using the interface to associate the captured signature with the at least one document to be signed;

controlling a recording device such that the recording device records audio and video of the second party observing the multimedia presentation during the transaction;

associating the second party's signature with the at least one document upon receipt of the command executed by the second party upon the second party's consent and thereby obtain at least one executed document;

displaying the at least one executed document to the second party using the display terminal;

least one executed document in a digital file format; and storing the audio and video recording of the second party observing the multimedia presentation during the transaction.

* * * * *

UNITED STATES PATENT AND TRADEMARK OFFICE
CERTIFICATE OF CORRECTION

PATENT NO. : 11,087,319 B2  
APPLICATION NO. : 15/985074  
DATED : August 10, 2021  
INVENTOR(S) : Christian et al.

Page 1 of 1

It is certified that error appears in the above-identified patent and that said Letters Patent is hereby corrected as shown below:

In the Claims

In Claim 19, Column 22, Line 40, after "terminal;" insert --saving the at--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*